United States Patent
Getzlaff et al.

[19]

[11] Patent Number: 5,889,969

[45] Date of Patent: *Mar. 30, 1999

[54] LOGICAL BUS STRUCTURE INCLUDING PLURAL PHYSICAL BUSSES FOR A MULTIPROCESSOR SYSTEM WITH A MULTI-LEVEL CACHE MEMORY STRUCTURE

[75] Inventors: Klaus Jorg Getzlaff, Schoenaich; Bernd Leppla, Chiningen; Hans-Warner Tast, Weil i. Schoenbuch; Udo Wille, Holzgerlingen, all of Germany

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 737,951

[22] PCT Filed: Mar. 27, 1995

[86] PCT No.: PCT/EP95/01140

§ 371 Date: Nov. 27, 1996

§ 102(e) Date: Nov. 27, 1996

[87] PCT Pub. No.: WO96/30842

PCT Pub. Date: Oct. 3, 1996

[51] Int. Cl.⁶ .................................................. G06F 13/00
[52] U.S. Cl. ........................ 395/293; 395/311; 395/729
[58] Field of Search ................................. 395/293, 298, 395/800.11, 305, 281, 729, 311; 370/235, 438; 711/144; 707/201

[56] References Cited

U.S. PATENT DOCUMENTS

4,807,184  2/1989  Shelor ..................................... 395/311
5,594,876  1/1997  Getzlaff et al. ........................ 395/293

*Primary Examiner*—Meng-Ai T. An
*Assistant Examiner*—Rupal D. Dharia
*Attorney, Agent, or Firm*—Marc A. Ehrlich

[57] ABSTRACT

An improved multiple bus system for a multiprocessor computer system is disclosed for a computer system having a multiple level cache memory structure. The system includes one or more logical busses each including two or more physical busses for coupling multiple processors to a memory unit. Each logical bus is coupled to a bus switching unit which in turn couples all of the processors in the multiprocessor system to a memory unit over the physical busses comprising the logical bus. The system further manages near end signal reception problems caused by multiple processors electrically interconnected over such a bus system.

12 Claims, 8 Drawing Sheets

FIG.1

| LINE NO. | BUS 0 | | BUS 1 | |
|---|---|---|---|---|
| | BANK 5 | BANK 6 | BANK 7 | BANK 8 |
| 0 | X | | | |
| 1 | | X | | |
| 2 | | | X | |
| 3 | | | | X |
| 4 | X | | | |
| 5 | | X | | |
| 6 | | | X | |
| 7 | | | | X |

LOGICAL BUS STRUCTURE INCLUDING PLURAL PHYSICAL BUSSES FOR A MULTIPROCESSOR SYSTEM WITH A MULTI-LEVEL CACHE MEMORY STRUCTURE

FIELD OF THE INVENTION

The invention is concerned with an improved multiple bus concept for multiprocessor computer systems, which predominantly comprise a multiple level cache structure. In particular this concept provides an improved bus switching unit and a method for near end signal reception in case of more processors electrically interconnected via such a bus system.

BACKGROUND OF THE INVENTION

The bus structure in a multiprocessor computer system has a significant impact on the overall performance, the functionality and the granularity of the system. One of the most important key characteristics for an efficient bus is its bandwidth which describes the ability of the bus to match with the processors speed and a variable number of processors. It depends on the bus width, the efficient usage of the bus by the bus protocol and the bus cycle time.

The bus width is limited by physical constraints of the package as there are chip pads, module pins or wireability of cards and boards. In prior art bus systems therefore either one large or a set of smaller busses is constructed.

In another prior art approaches a smart bus protocol allows bus interleaving between processors to fill the time gap on the bus caused by the access time of the addressed memory bank. "Bus interleaving" is a known method to use wait cycles on a bus to issue a command to other memory banks. It allows several memory banks per bus to be operated simultaneously in order to increase the bus- and memory bandwidth.

The bus cycle time is the main contributor to the bus bandwidth. An efficient bus structure has to provide excellent electrical characteristics to match the processor and the bus cycle time as close as possible. For example, a simple structure which connects processors like a laundry line limits the cycle time and the number of processors by its poor electrical characteristics. In contrast, a much more complex structure provides point to point busses between each processor and a central switch unit. One or several memory banks are connected to that unit. That structure allows a short bus cycle, but requires an extensive wiring. For the packaging, a central switch unit also requires a very high pin count, since all busses are routed to the switch.

In addition, in prior art systems the performance of bus structures is improved by concepts for bus arbitration which may either be implemented as a distributed or a central arbitration function. The central arbitration concept is based on an additional hardware component, a controller, like a central bus switch. It receives all bus requests, performs the arbitration and delivers the grant to the requesting unit in the next cycle.

The distributed approach requires more wiring, because all request lines have to be wired to all bus participants. But its advantage is that the arbitration can be fulfilled within one cycle, since only one off-chip network is in the path, compared with the a central arbitration. The complete path consists of an off-chip network, i.e. the request lines, and the arbitration logic. If this limits the bus cycle time, then a two cycle central bus arbitration will become the preferred solution.

A further key characteristic for an efficient bus structure is the provisions which provides for data consistency assurance in a multiple cache processor structure. A known simple concept is the so called bus snooping. Hereby each processor monitors the bus operations of all other processors to keep track on the status of its cache lines. The status may be "modified", "exclusive", "shared" or "invalid". The required actions are a line invalidation or a cast-out of modified data with or without updating the memory. A cast-out of modified data means that a PU is no longer the exclusive owner of the line. All those operations are initiated and controlled by the individual processors.

But this simple concept has its limits, if there is more than one bus in the structure, as in a system with a central switch. Hereby data consistency has to be controlled by the central switch. It keeps copies of all cache directories of the processors, as well as the status of each line. The central switch monitors the status of the cache lines, initiates cast-outs from processors, if required, and issues the necessary memory commands and the data transfer. Advantageous are the short cycle time and the high bus/memory bandwidth. But a disadvantage of this approach is that it requires a design effort comparable to a complete processor, including a cache. Therefore, this costly concept can be only implemented in high end mainframe designs.

Such a central arbitration concept is disclosed in IBM Technical Disclosure Bulletin, vol. 35, no. 6, November 1992 (FIG. 2) employing a central crossbar switch. Herein, memory requests are transferred via a processor bus, and data via the crossbar switch to a memory unit. This dividing up concept allows a central memory control for an interleaving access to a number of memory banks.

Another approach for central arbitration is given in U.S. Pat. No. 5,355,455 to the present assignee which concerns with the problem of deadlocks in computer systems with several busses being connected by a bus adapter. The bus adapter divides the common bus system into two partial busses wherein the first part contains a processing unit and a memory unit, and the second part contains several I/O control units (FIG. 1 of that document). The underlying problem of that invention is concerned with computer systems having two data busses, where a bus unit of the first bus wants to communicate with a bus unit of the second bus, while a bus unit of the second bus wants to communicate with another bus unit of the first bus, normally leading to a deadlock situation. This problem originates in a bottleneck situation on grounds of the only one bus adapter and is particularly solved by introducing a BUS SUSPEND control signal.

An example for a distributed arbitration approach is disclosed in U.S. Pat. No. 5,093,826 assigned to Siemens Aktiengesellschaft, Germany, which is related to a redundant bus system which is split into two arbitrary halves which are connected to corresponding halves of a redundant main memory. Hereby identical information are stored in the two different memories. According to the teaching of that patent, in a special operating time, individual processors, one bus system half, and some of the memory sections are split off and interconnected to form an independent special-purpose computer.

European Patent Application No. 0 557 651 concerns with a multiprocessor system which allows an efficient interleaving on a memory bus. This concept allows multiple access of bus participants to the memory since the memory is logically divided into at least two memory banks.

Further, in German Patent GE-PS 3 708 887, a parallel bus structure is disclosed, whereby the bus is divided into sections by means of registers being inserted between those sections. In each bus section at a given time data are transferred independently of each other, or data are pipelined. Due to subdividing the data bus in individual bus sections with a physical length of typically centimeter, the signal transmission time is strongly reduced. Therefore higher cycle times and transfer rates are achievable.

SUMMARY OF THE INVENTION

It is therefore an object of the present invention to provide an improved bus concept for a tightly coupled multiprocessor computer system which aims at maximum bus bandwidth by the usage of a simple and efficient multiple bus system at minimal bus cycle time.

It is another object to provide a bus structure which comprises a highest amount of system's modularity with respect to the extension and the reduction of the computer system where this bus concept is implemented.

A further object is to provide a bus structure which aims at maximum point to point connectivity between the bus participants.

The bus structure according to the present invention solves this problem by providing logical busses, which are built by two or more physical busses. The number of physical busses is variable and may scale with the number of processors interconnected by that bus system. Further, each logical bus contains a bus switching unit (BSU) and is connected to a memory bank, wherein the processors are connected to each logical bus via physical busses and the bus switching unit(s).

The physical busses allow each processor to have access to each logical bus. Hereby parallel access of one or more processor units to one or more memory units is supported in a very efficient manner. It is accentuated that this parallel processing concerns the access of one processing unit to several memory units as well as the access of several processing units to several memory units.

Moreover, data consistency is accomplished by a bus arbitration logic which allows only one processor access to a logical bus at a given time. This automatic serialization of bus requests for the same line by several processors simply allows exclusive ownership by only one processor at a given time. Additionally, bus interleaving for different memory units on a logical bus can be simply fulfilled.

With this multiple logical bus concept a particular connectivity and bandwidth improvement over a single bus concept with double or four times bus width is achieved.

Linefetch operations on a bus generally consist of command-, memory wait-, and data transfer cycles. A single bus improvement does only reduce the number of cycles for a data transfer, but not for command or memory wait operations. This multiple logical bus concept requires less cycles per bus operation, because the complete operations can be fulfilled concurrently. The loss of one cycle during the BSU operations has only a small impact on the systems performance with respect to the smaller cycle time.

The BSU in the proposed bus structure serves as a switch 1>n by which command/control signals and data from one port are driven to all other ports in the next cycle. Each BSU works only on one logical bus which is split up in several physical busses to improve the bus cycle time due to the electrical point to point connections between the different bus participants. The logical busses are routed all the way via the respective BSUs to their memory units. So this set-up allows a parallel selection of the memory units within the system.

By splitting a second-level cache memory unit into at least two parts it is accomplished that each single processor or a group of processors have an electrical point to point connection to each of the BSUS. Thus the physical structure of these BSU busses can be built such, that it allows a bus cycle equal or close to the processor cycle.

Further the variable number of physical busses allows simple adaption of the bus structure to processor and bandwidth requirements, e.g. in case of an extension of the number or group of numbers of processors.

In particular, due to its modularity, the proposed structure can be used to build a variety of systems which are optimized towards high performance or cost/performance or low cost. Different packages may be chosen like multiple chip modules for high end systems with a large number of logical busses and processors or as a low end system with two processing units and one logical bus, mounted on single chip modules on card.

Further this modular system structure allows system operation after hardware defects in a degraded mode, e.g. with a reduced number of processing units, a reduced number of processor clusters or a reduced number of busses or memory cards, respectively.

The proposed bus concept can not comprise separate command-, address- and data busses. For limitation of the signal count they are all multiplexed on the same physical busses. Therefore a different bus communication is required, depending on command, address or data on the bus. For the details of this communication it is referred to the figurative description.

In another embodiment, these communication protocols are handled by the BSU, particularly including the redrive mechanism for simple broadcasting information on the overall bus.

In a further preferred embodiment of the invention, data consistency is further improved by providing a bus arbitration unit for granting access to a logical bus to only one processor at a given time. The serialization of bus requests for the same line by several processors is enforced by assigning the logical busses to address classes. Assigning each logical bus to only one address class assures data consistency very efficiently. Hereby each bus can have its own congruence class, determined by e.g. the low order line address bits. A requesting processor selects the proper logical bus only by this criterium. The overall performance of the bus structure can be further improved by implementing the bus arbitration function within the bus switching unit. The cycle time of the bus can be further improved by a redrive logic on the bus toward the command and the data direction, e.g. Pu>Cache>Bus>Redrive>Bus>Memory (Command) or Memory>Bus>Redrive>Bus>Cache>Pu (Data). Those partial busses allow shorter cycle times, however one cycle has to be spent in the redrive logic in each direction.

The BSU connects different physical busses between a number of processor units, cache memories, memory bus adapters and storage controllers, and redrives incoming data to those bus participants. Thus it may involve the bus redrive and control signal redrive functions, whereby the BSU does not have to contain any functions to assure data consistency among the processor caches. It rather redrives the command cycle of an active processor from one bus back to all the other busses including the command select signal. This causes the other processors to perform a bus snooping operation for the line in question.

By the proposed structure all bus snooping actions can also remain in the processors themselves. No copies of the cache directories have to be maintained. Further, no bus cycle is lost by the redrive of a command on the other busses, because the BSU issues commands on the memory bus concurrently.

The bus switching unit further serves as a memory interface, which also matches the processor cycle time, since this is a point to point connection between BSU and memory.

It is further important to contain the associativity of the data lines throughout the complete memory hierarchy. Advantageously all line replacement actions, as they come up during a linefetch operation, are always related to the initially selected logical bus and the memory unit. There is no interference between busses nor interleaved lines.

The redrive function can be also fulfilled exclusively by the processors. The memory units preferably comprise at least two memory banks being controlled by a storage controller. The logical busses are routed all the way via the respective BSU's to their memory banks which allows a parallel selection of memory banks within the system. All line replacement actions, as they come up during a linefetch, are always related to the initially selected bus and bank. There is no interference between busses nor between interleaved lines.

Another aspect of the invention is a method for handling near end signal reception problems in the proposed bus structure where clusters of processors are not interconnected by point to point connections. In particular, all near end drive/receive operations, like bus snooping or casting-out on the same physical bus, whereby one processor possesses an actual line and has to transfer it to a neighboring processor, are executed in two cycles. In particular, dependent on the actual signal reflection behaviour, it is interchanged dynamically between the one-cycle and the two-cycle operation mode of the information transfer. Further only a one-cycle control signal is needed for the overall bus structure.

BRIEF DESCRIPTION OF THE DRAWINGS

These and other objects, features and advantages of this invention will become apparent to those skilled in this art from the following more particular description of one presently preferred embodiment of the invention, taken in conjunction with the accompanying drawings, in which.

DETAILED DESCRIPTION OF THE PREFERRED EMBODIMENT OF THE INVENTION

Figure 1:
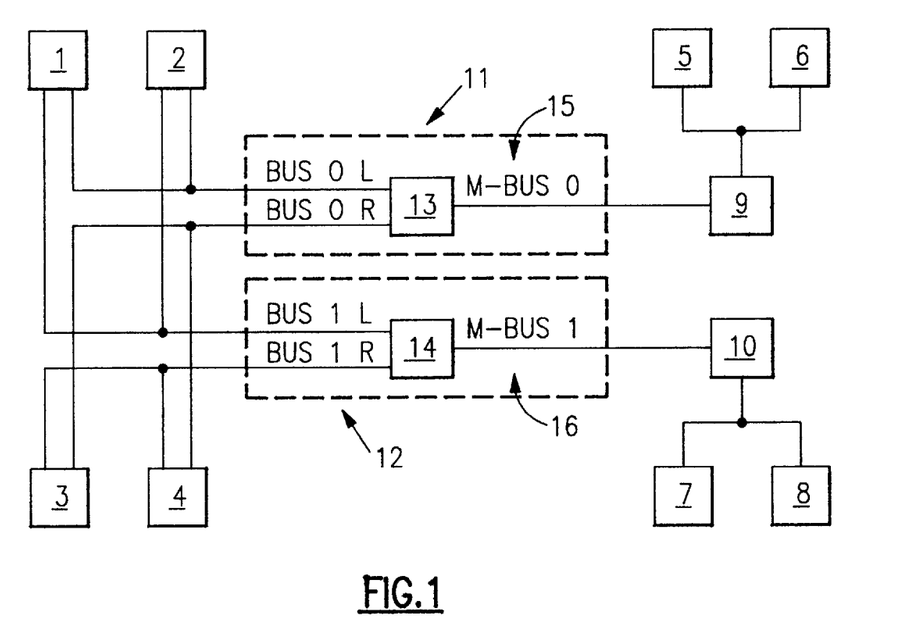
FIG. 1 is a block diagram showing the fundamental features of the multiple bus structure according to the invention.

FIG. 1 is a schematic overview of a multiprocessor computer system comprising a multiple bus structure according to the invention. The multiprocessor system exemplary consists of four processors 1, 2, 3, 4 with no private L2 cache memories and a main memory which is divided exemplary into a first memory bank built by two memory modules 5, 6 and a second memory bank built by two memory modules 7, 8. The memory banks 5, 6 and 7, 8 are controlled by storage controllers (STCs) 9, 10.

The common bus system is divided in two logical busses 11, 12 which are labeled by logical reference numbers 0 and 1, respectively, wherein each of the logical busses comprises a bus switching unit (BSU) 13, 14. Each of the processors 1, 2, 3, 4 is electrically (or a light connection within a laser computer) connected to each of the BSUs 13, 14 whereby providing a bus network (no point to point connections) with four physical busses "0L", "0R", "1L", "1R".

The BSUs 13, 14 connect the four physical busses on the processor side to the memory banks 5, 6, 7, 8 via memory busses 15, 16. It is noteworthy that the number of logical busses 11, 12 equals the number of BSUs 13, 14. The BSUs 13, 14 contain bus arbitration functions (not shown) for controlling access to the logical busses 11, 12. It is emphasized that each of the logical busses 11, 12 provides a single line connection to a memory bank 5, 6, 7, 8.

It is further emphasized that, by this multiple bus concept, the number of processors 1, 2, 3, 4 and the number of memory units or memory banks 5, 6, 7, 8, respectively, per logical bus 11, 12 can be extended easily. In case of adding a number of processors, no further BSUs 13, 14 are required. In accordance, improving of the system by adding further memory banks, may change the number of logical busses or BSU's, respectively.

Further key elements of this bus structure are that the logical busses 11, 12 are built by a variable number of physical busses and that both logical busses 11, 12 allow n-way bus interleaving, e.g. a 4-way interleaving in the embodiment according to FIG. 1, 2-way for each logical bus 11, 12 due to the two memory banks 5, 6, 7, 8. But there may be multiple banks per logical bus 11, 12 to support a more complex bus interleaving.

Figure 6:
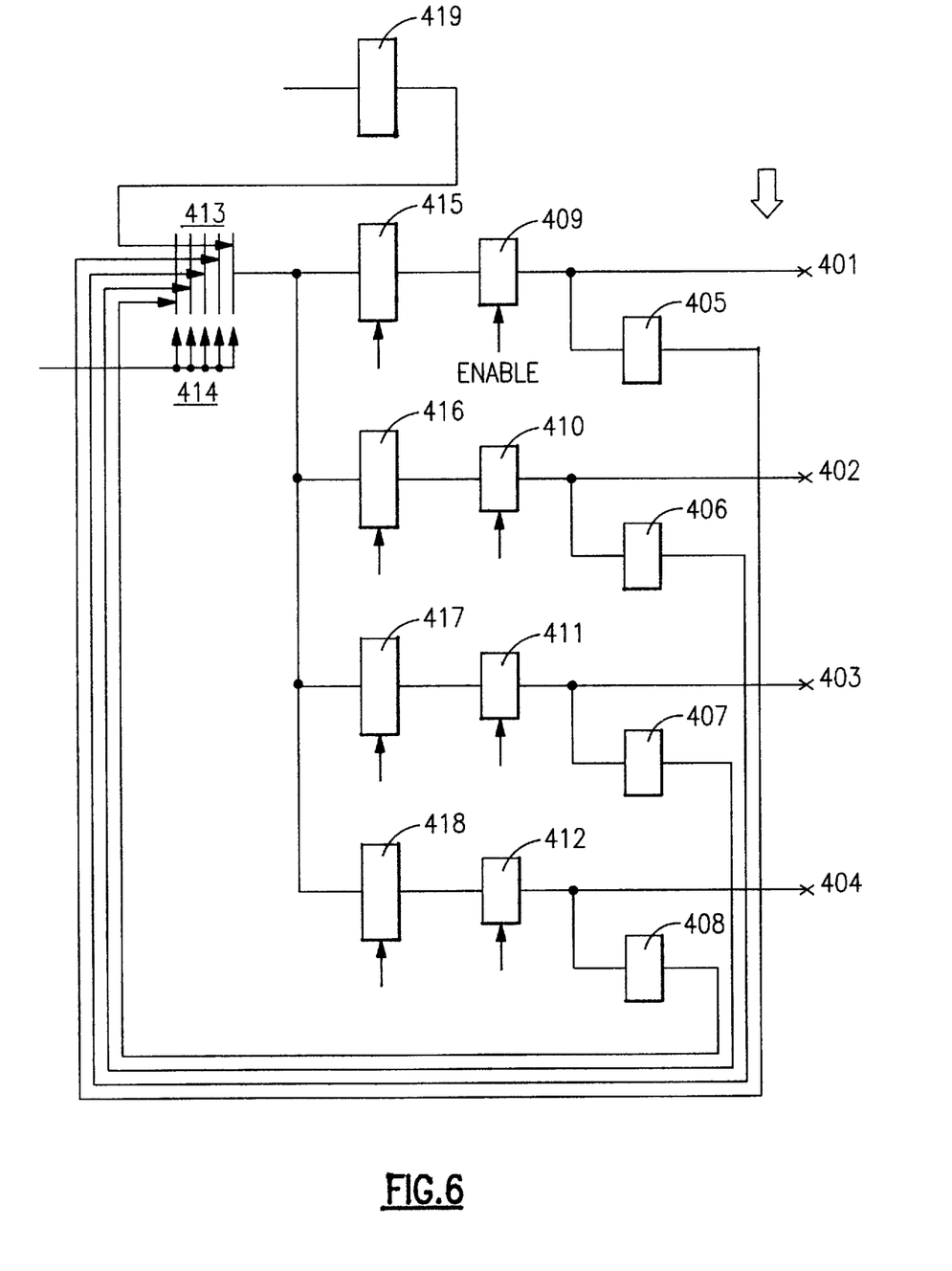
FIG. 6 shows a preferred implementation of the BSU (bus switching unit) according to the invention.
Figure 8:
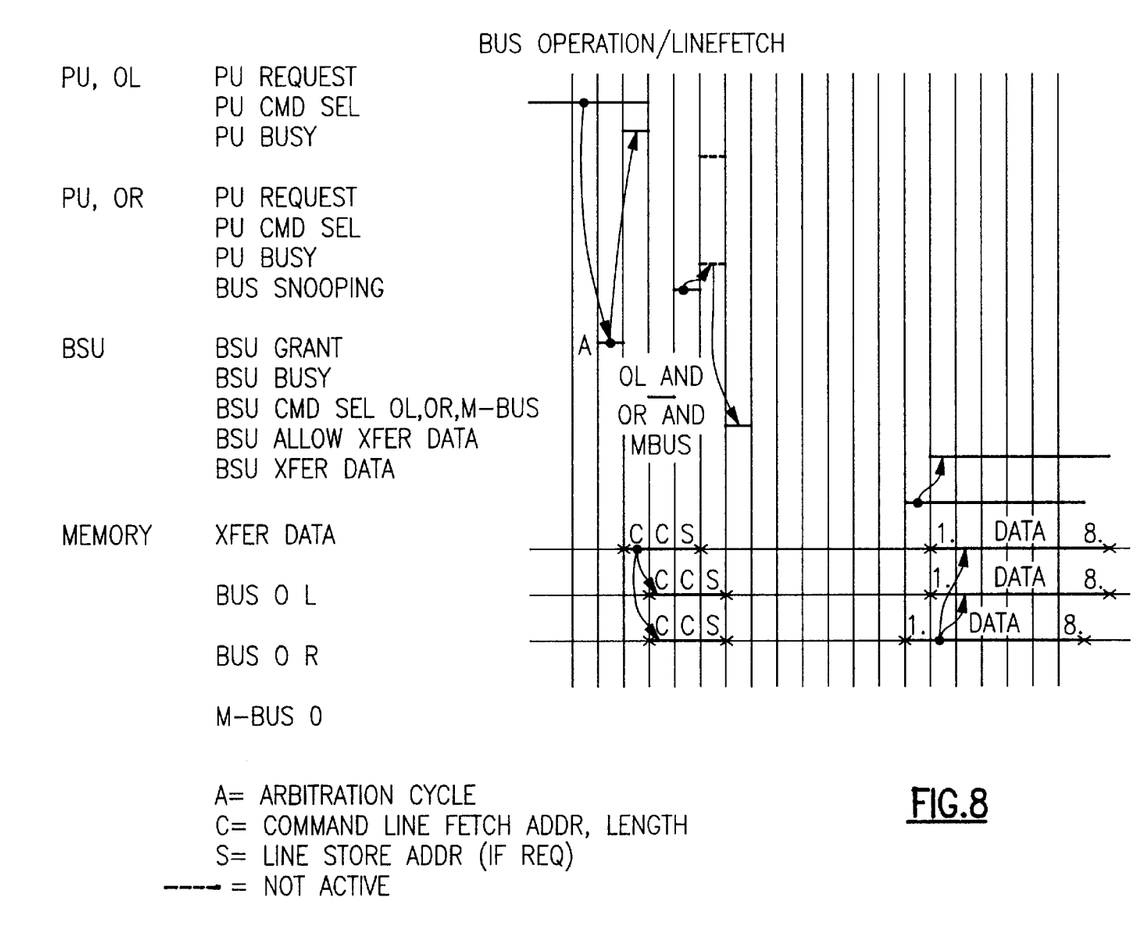
FIGS. 8 and 9 are timing charts showing the bus protocol for a "linefetch" and a "linefetch with cast-out operations" on a bus structure according to this invention.
Figure 9:
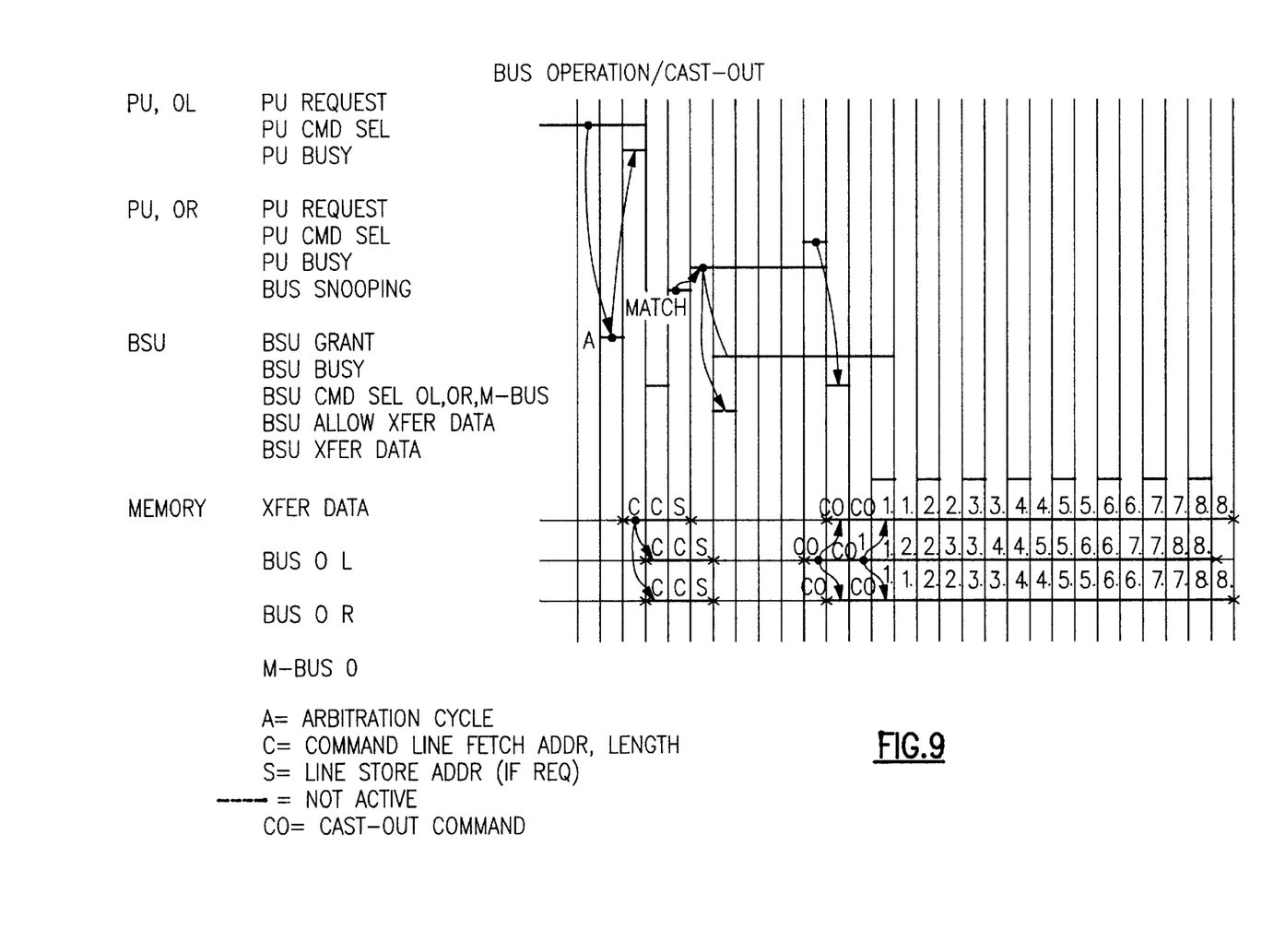

The bus structure according to FIG. 1 does not comprise separate command-, address- and data busses. To limit the signal count they are all multiplexed on the same physical busses (FIG. 6). Therefore, a different bus communication is required, depending on commands, addresses or data on the bus (FIG. 8 and 9). For instance, data are only exchanged between processors 1, 2, 3, 4 and BSUs 13, 14, with the exception of cast-out operations. But command and address cycles require both, processor-BSU and processor-processor communication.

Each of the logical busses 11, 12 in FIG. 1 is assigned to its own congruent address class. This is illustrated with respect to FIG. 2 for the exemplary case of a 2-logical bus system with 2-way interleaving on each logical bus according to FIG. 1. The total memory address space is divided into blocks of cache line size and each of the blocks is associated with a bus and a memory bank by the low order address bits.

Figure 2:
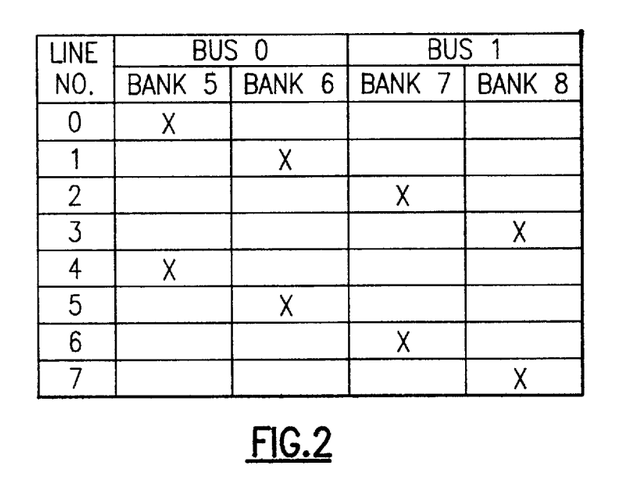
FIG. 2 is a table showing the line assignment of a structure with two logical busses allowing a two-way interleaving on each memory bus.

It is hereby assumed that eight lines 0–7, e.g. cache lines in case of processors with second-level L2 cache memories, are stored in the main memory 5, 6, 7, 8. Each line is characterized by the number of the logical bus and the memory bank where it is stored.

The congruence class can be easily determined by the low order address bits of the lines. A requesting processor 1, 2, 3, 4 selects a proper logical bus 11, 12 only by this criterium. The logical busses 11, 12 are routed all the way via the respective BSU's 13, 14 to their memory banks 5, 6, 7, 8. This set-up allows a parallel selection of the memory banks 5, 6, 7, 8 within the whole system whereby ensuring that each line can be accessed by only one processor at a given time. If more processors request an access to the same line, due to the serialization of access automatically achieved by these classes assures very effectively data consistency in the whole computer system.

A further advantage of this set-up is, that all line replacement actions, as they come up during e.g. a linefetch operation, are always related to the initially selected logical bus 11, 12 and the initially selected bank 5, 6, 7, 8. There is no interference between busses nor between interleaved lines.

Figure 3:
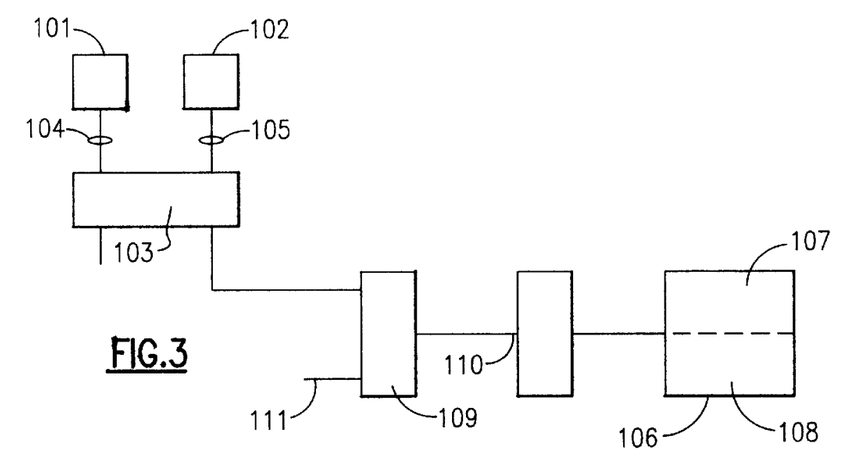
FIG. 3 is an embodiment of the bus structure according to the present invention in a low end computer system which comprises two processors with a shared L2-cache memory being connected to a memory bank via one logical bus.
Figure 4:
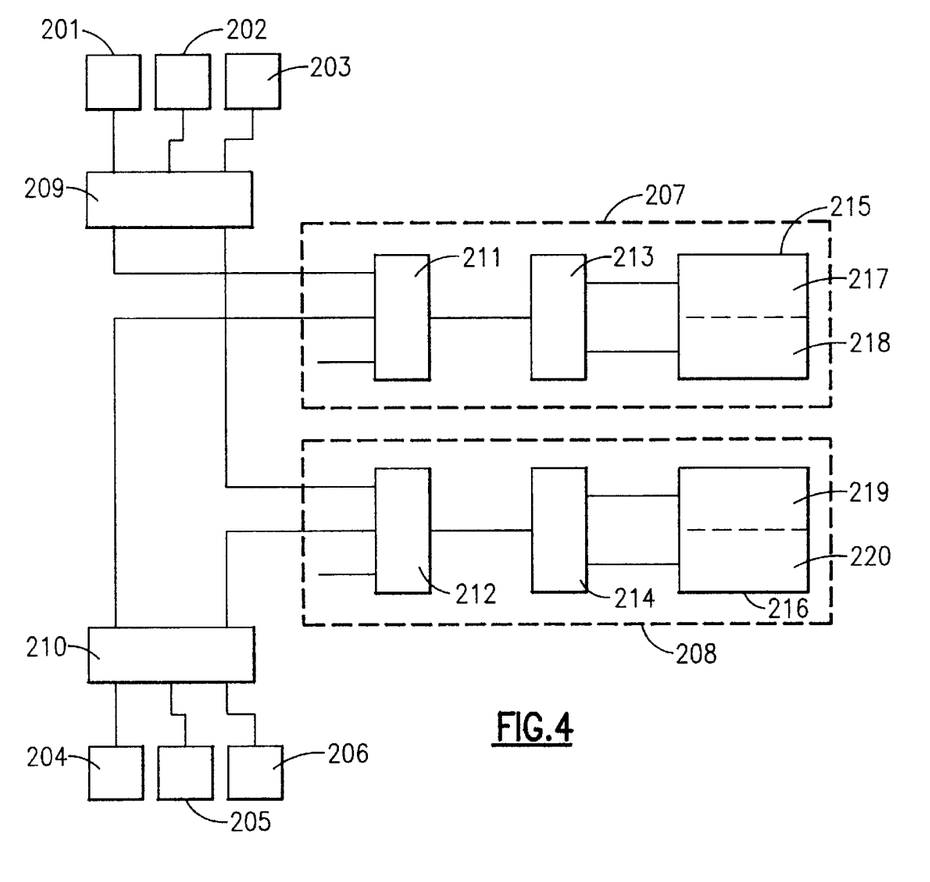
FIG. 4 is a further embodiment of the bus structure in an intermediate computer system which comprises six processors being connected to memory banks via two logical busses.
Figure 5:
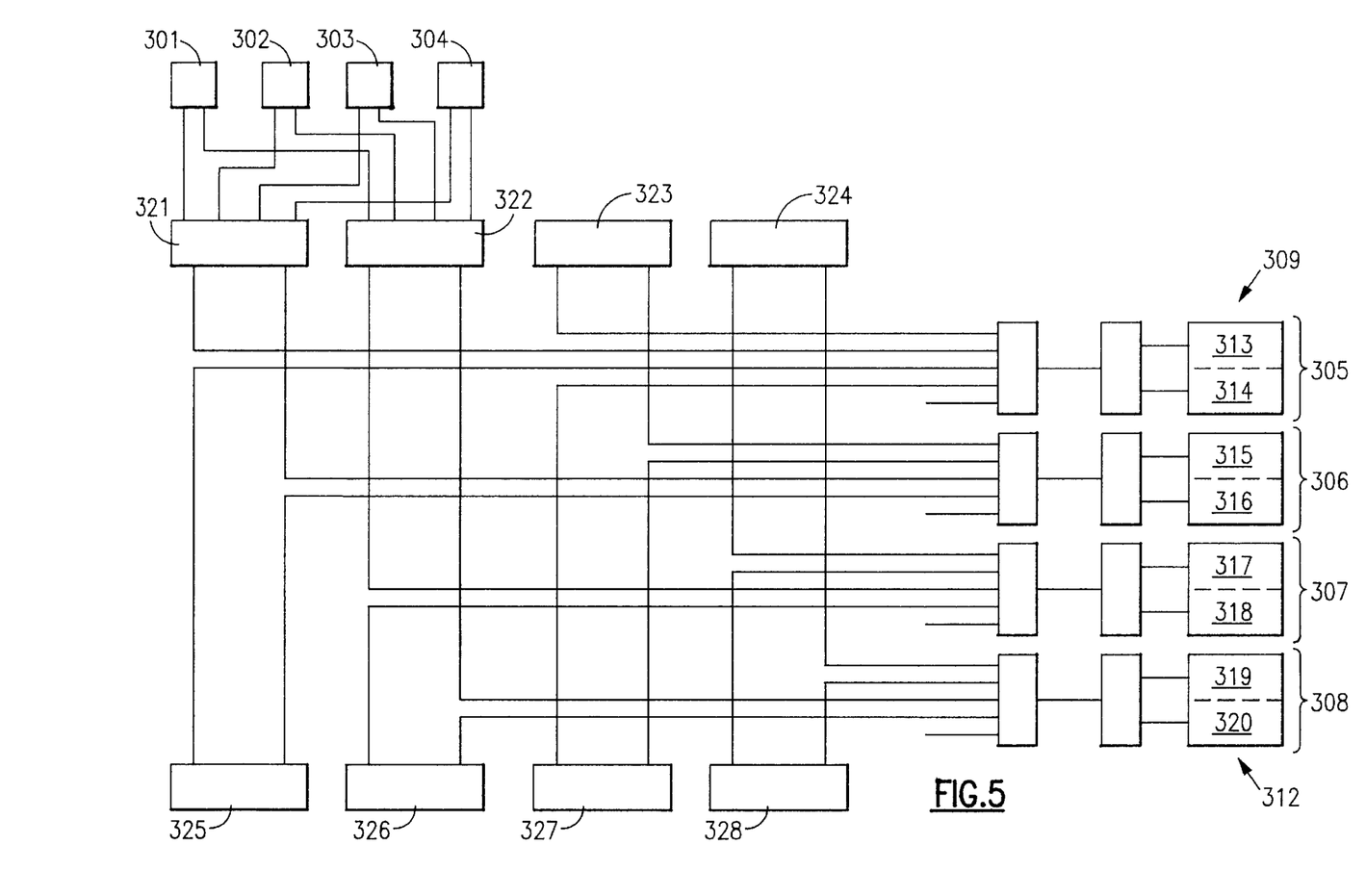
FIG. 5 is a preferred embodiment of the invention in a high end computer system with 16 processors being connected to four memory banks via four logical busses.

The proposed bus structure can be implemented within the whole range of so-called "low end" and "high end" multiprocessor computer systems comprising at least two processor units. In FIGS. 3 to 5 this broad range of applicability is illustrated by its implementation within three different systems.

At first, in FIG. 3 a low end computer system with two processors 101, 102 is shown, which are connected to a shared L2 cache memory 103 via physical busses 104, 105. The system also provides a main memory unit 106 which exemplary includes two independent operating memory banks 107, 108. A storage controller (STC) is provided in order to control access to the memory banks 107, 108. The processors 101, 102 and the memory units 107, 108 are interconnected by a bus switching unit (BSU) 109 via a logical bus 110. The BSU 109 provides also an input/output port 111 which serves as a connection to external I/O devices. In this structure both processors 101, 102 have an electrical point to point connection to each of the memory banks 107, 108. This system can be easily extended by adding more processors or memory modules. In the latter case for each memory unit only a further logical bus has to be implemented, not changing the existing part of the whole system.

FIG. 4 depicts a system with six processor units 201–206 and two logical busses 207, 208 as an example of an intermediate computer system. Three processor units are connected to shared L2 cache memories 209, 210. Each of the logical busses 207, 208 provides a BSU 211, 212 and a STC 213, 214 and is connected to a memory unit 215, 216 each of them built by two memory banks 217–220, respectively. It is seen, that this bus concept provides electrical point to point connections between the processors 201–206 and the memory banks 217–220. Therefore, each line stored in the main memory can be only accessed via one physical bus.

An implementation of the bus structure in a preferred high end computer system with sixteen processors, and four logical busses 305–308 is shown in FIG. 5 only four processors 301–304 are shown. Further each logical bus 305–308 provides a main memory unit 309–312 whereby the memory units are built by memory banks 313–320. It is noteworthy that each group of four processor units, e.g. group 301–304, is connected to two L2 cache memories 321–328. Despite of the complexity of this system, all processors 301–304 and memory banks 313–320 are linked by a simple point to point connection. Moreover, due to splitting the L2 cache memories in two parts not only two processor units 301–304 but also one processor unit can communicate with the main memory at a given time.

In FIG. 6 a block diagram of the redrive logic of the BSU according to the invention (within a system as in FIG. 4) is depicted in more detail, together with the data flow inside the BSU. The BSU provides four bi-directional ports 401–404 wherein the ports 401–403 represent ports to the bi-directional physical busses on the processor side of the BSU, and the port 404 is connected to a bidirectional memory bus. The incoming traffic first passes a bus receiver 405–408, wherein the control signals of bus drivers 409–412 are disabled. The incoming traffic is transferred to a multiplexor 413 where the appropriate signals are selected by incoming command signals 414. The traffic is further buffered in registers 415–418 and thereafter fed into the drivers 409–412. From here the signals (traffic) are redriven to all busses via ports 401–404. Signals produced internal by the BSU, itself, are transferred via a bus receiver 419 to the multiplexor 413.

Thus the BSUs serve as switches 1>n which connect and redrive command/control signals and data from one port to all the other ports in the next cycle. In a further embodiment, the BSU contains different functions, namely a bus redrive and a control signal redrive function, a memory interface and bus arbitration. The BSUs redrive commands and data from one source port to all other ports, including the memory bus. Most of the respective control signals are also redriven. Complete informations are buffered in the BSUs and distributed in the following cycle.

Hence each single processor or a group of processors has a point to point bus connection to each of the BSUs, a bus cycle equal or close to the processor cycle is achieved. All near end drive/receive operations, like bus snooping on the same physical bus, are accomplished in 2 cycles. Here through it is guaranteed that electrical signal reflections at the end nodes of the physical bus structure are suppressed at least in the second cycle. Thus reflection noise signals can be suppressed very efficiently.

The point to point busses allow optimal short bus cycles and can be implemented by grouping of processors and L2 cache chips in building blocks (clusters). This structure can be built by point to point busses between processors and L2 cache chips as well as between each group and their respective BSU chip(s).

The memory interface between the BSUs and the STCs consists of only four signals: After data signal which indicates that data are on the bus, an Allow transfer data which confirms a data request by a processor, a Command select which indicates that a command is on the bus, and a Memory error, which indicates an error or invalid data on the bus.

Bus arbitration can be also performed by the BSUs. Hereby all requests are collected and honored with a grant signal to the requesting processor when allowed by the arbitor logic and when the bus is available.

The BSUs do not comprise any functions to assure data consistency among the processor caches. They rather redrive the command cycles of active processors from one bus back to all others, including the Command select signal. This causes the other processors to perform a bus snooping operation. If one or more processors find the line, they raise a busy signal to the BSUs, until they have taken the required action. Again, the busy signals are redriven to all other processors, including the requesting one. The implementation of the bus snooping functions in the processors are only small add-on's, because most of the required functions are already contained in the cache control unit of the processors.

Figure 7:
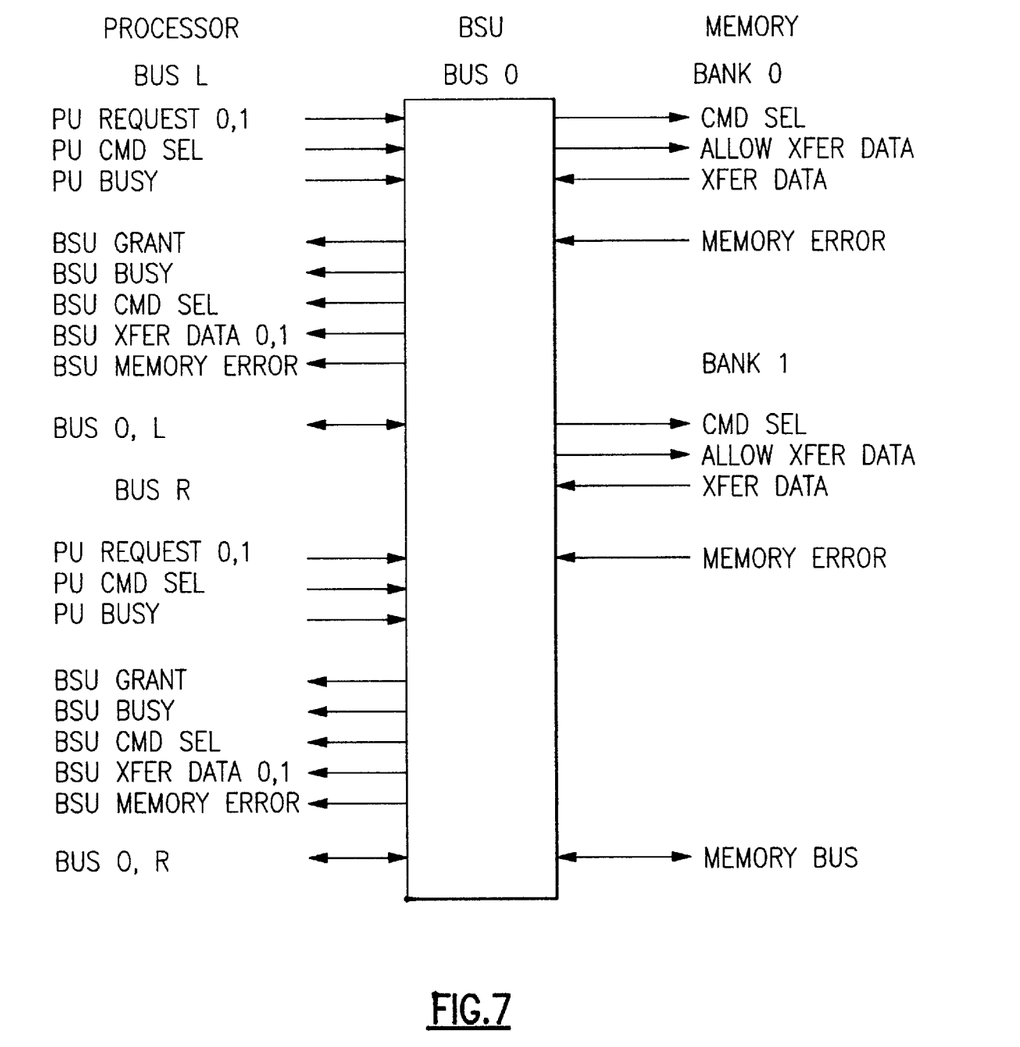
FIG. 7 shows a complete control signal structure of the basic bus operations accomplished by the BSU.

The basic bus operations accomplished by the BSUs are illustrated in the following with regard to FIG. 7:

PU REQUEST

This control signal concerns a processor bus request to the BSU arbitration logic. A request can be principally directed to e.g. linefetch/linestore, line invalidate or I/O fetch and store operations. The requesting PUs decide by means of the address classes, on which logical bus a request has to be transferred. Herethrough a definite access to a memory bank can be achieved.

PU CMD SELECT

The control signal being sent by a PU indicates that a command, a field length and an address are on the bus. The signal is received by a definite BSU which redrives the signal in the following cycle on all other busses, including the memory interface as a BSU CMD SELECT.

XFER DATA

This signal being sent by the memory indicates that data are on the bus, e.g. due to a linefetch operation. The signal is received by a definite BSU which redrives the signal in the following cycle on all other busses as an BSU XFER DATA signal. In case of a cast-out operation, the signal is generated by a BSU.

PU BUSY

This signal is a response from a processor indicating that a matching line is found. The processor keeps the signal on until the required action is completed. The signal is received by a definite BSU and redriven in the following cycle on all other busses as a BSU BUSY signal.

BSU GRANT

A BSU grants its logical bus to a requesting PU as a result of an arbitration which results in an availability of that bus.

ALLOW XFER DATA

This control signal confirms a data fetch/store command to the memory and indicates, that no cast-out will occur. The signal is generated by a BSU when the signal PU BUSY is not raised or dropped without a cast-out as a result of bus snooping.

MEMORY ERROR

This error indicating signal is generated by the memory controller of a memory bank. The signal is received by the BSU and redriven in the following cycle on all other busses as a BSU MEMORY ERROR signal.

All those signals are provided for all physical busses. Their total amount may differ with the number of processors, connected to one bus.

The bus structure and the bus protocol allow synchronous bus snooping for all processors without relevant performance degradation. This avoids cache directory copies of all processors in the BSU and finally allows multiplexing of addresses and data on the same bus, wherein no extra address bus is required.

In FIG. 8 the functionality of the bus structure according to the invention is illustrated by means of a timing chart representing a linefetch bus operation. In order to simplify the basic aspects of the bus concept, the operations relate to a system embodiment comprising only two processors ($PU^0$, $PU^1$) which communicate via a logical bus being split in two physical busses (0L, 0R) which are connected to a bus switching unit (BSU). Further the BSU is connected to a memory unit via a memory bus (M-BUS).

First $PU^0$ sends a linefetch request to the BSU. After an arbitration cycle (A) the BSU grants the logical bus to the requesting $PU^0$ as a result of its availability. $PU^0$ generates a PU CMD SELECT control signal which indicates that a command, a linefetch address and a length (C) are on physical bus 0L. The BSU redrives the PU CMD SELECT signal in the following cycle on the other physical busses, i.e. BUS "0R" and M-BUS, as a BSU CMD SELECT signal. Therefore, the command, linefetch address and the length information reach those busses with one cycle latency.

The BSU CMD SELECT signal on bus 0R causes $PU^0$ to perform a bus snooping operation within a bus snooping time window. $PU^1$ does not find the requested line and so the PU BUSY control signal becomes not active. This control signal would only become active if $PU^1$ would find a matching line. In case of other processors connected to physical bus 0L, also a PU BUSY signal on physical bus 0L would have to be regarded. With the PU BUSY signal being not active, the BSU confirms the linefetch command to the memory unit by generating a BSU ALLOW XFER DATA control signal.

The memory unit now sends the requested data to the BSU via the M-BUS wherein an XFER DATA control signal is generated by the memory in parallel. This control signal and the data are received by the BSU and redriven with one cycle latency on all other busses. The control signal especially is redriven as a BSU XFER DATA control signal. Both control signals keep on the busses as long as data are on the busses.

FIG. 9 shows, for example, a timing chart for a cast-out operation in response to successful (matching) bus snooping in a system according to FIG. 8. In particular, herein the near end reception problem is illustrated.

Again, in the first place $PU^0$ requests for a line (linefetch) via physical bus 0L. The BSU grants the bus to $PU^0$ and therefore a command, a linefetch address and a length get on the bus 0L of that PU. Further a PU CMD SELECT control signal is generated in parallel by the PU indicating this state of the bus. This control signal is received by the BSU and redriven in the following cycle on all busses as a BSU CMD SELECT signal. This signal initiates a bus snooping operation of $PU^1$. It is supposed that $PU^1$ finds the line and raises a PU BUSY control signal to the BSU. The signal is kept on the bus until the required action of $PU^1$ is completed, and is received by the BSU and redriven in the following cycle on all other busses as a BSU BUSY control signal.

$PU^1$ puts a cast-out command on bus 0R which is redriven with one cycle latency to all other busses. At the same time $PU^1$ raises a PU CMD SELECT signal to the BSU which is redriven to all other busses in the following cycle. Now the eight data packets are transferred from the memory unit to $PU^1$.

Figure 10:
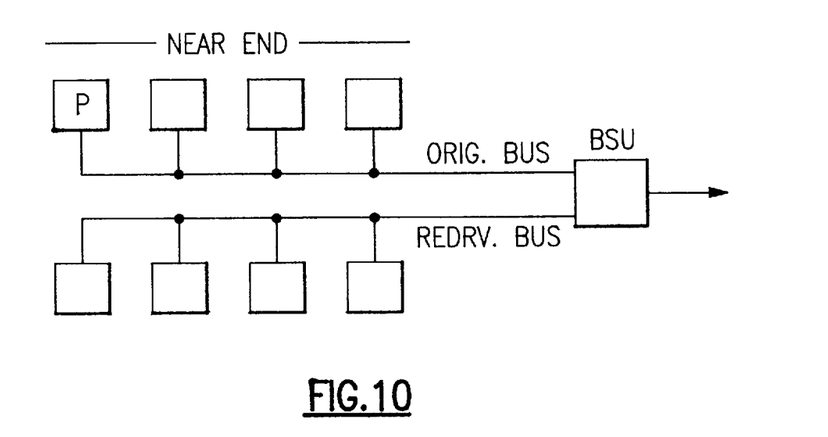
FIG. 10 is a schematic block diagram of a processor cluster connected to a logical bus via a BSU, illustrating signal reception behaviour of a multiple bus due to bus delays (no electrical point to point connections)
Figure 11:
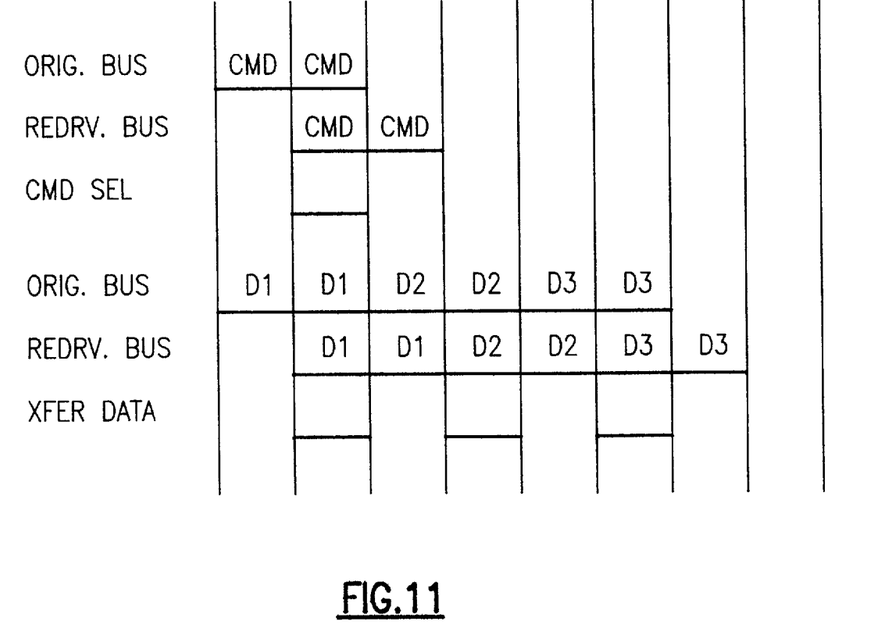
FIG. 11 depicts the bus structure of FIG. 10 together with the respective control signals.

This processor-processor communication on that near end leads to an electrical signal reflection behavior wherein the signals which are raised by the both processors and redriven by the BSU interfere on each physical bus. The signal reflection of the present bus structure can be used to optimize the bus cycle time. The bus delay depends on whether a signal is sent to a near-end or a far-end receiver, since the reflection returning from the far-end disturbs the reception on the near-end side. That phenomenon is well-known for all non-terminated physical networks. FIG. 10 exemplary shows this type of a physical bus. Hereby the proposal of the invention is to keep a physical bus being disturbed for two cycles valid for commands, bus snooping addresses and cast-out data in order to allow near-end reception. Due to the cast-out operation, a BSU XFER DATA control signal is generated by the BSU for the second cycle of each data block on bus 0R. The data blocks are also redriven to the other busses with a one cycle latency. This one cycle delay of the control signal has the advantage that those reflected signals have only a small impact on the systems performance but relaxes these critical bus operations. FIG. 11 shows these busses together with the respective control signals. Hereby CMD SELECT and XFER DATA signals are driven from the BSU indicating the bus validity on both, the originating and the redriving bus.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims.

We claim:

1. A logical bus structure for a multiprocessor system comprising at least two processing units and at least one memory unit, the logical bus structure comprising:

a plurality of physical busses capable of coupling to one or more of said processing units;

a memory bus capable of coupling to said at least one memory unit; and a bus switching unit coupled to said plurality of physical busses for coupling all of said processor units to one another through the bus switching unit, said bus switching unit further coupled said memory bus for selectively coupling each of said coupled processor units to said least one memory unit by selectively coupling each of said plurality of physical busses to said memory bus;

and wherein said bus switching unit arbitrates the coupling of each of said processor units to the memory unit by collecting requests from said processor units to couple said processor units to said memory unit and honoring of said collected requests from said requesting processor in the event that said requests are allowed by an arbitration logic and in the event that said memory bus is available.

2. The logical bus structure according to claim 1, wherein addresses, commands and data are transferred via single lines of the physical busses.

3. The logical bus structure according to claim 1, wherein said bus switching unit comprises a bus arbitration unit which grants access to the memory bus to only one of the processing units at a given time.

4. The logical bus structure according to claim 1 wherein logical bus structure is assigned to at least one address class, the address class being defined by reference numbers of the logical bus structure and the memory unit, the quantity of said address classes depending on the number of said memory units.

5. The logical bus structure according to claim 1 wherein the processing units may be organized into a number of groups and wherein the number of said physical busses scales up and down with the number of said processing units or with the number of groups of said processing units.

6. The logical bus structure according to claim 1, wherein the memory unit comprises at least two memory banks which are controlled by a storage controller means and which allow n-way bus interleaving.

7. The logical bus structure according to claim 1, wherein the multiprocessor memory system further comprises at least two second level cache memory units, and wherein each of the processing units is connected to each of the cache memory units by a single bus.

8. The logical bus structure according to claim 1, wherein the bus switching unit comprises:

receiving means and register means for gathering and buffering incoming information;

driving means for driving information into and redriving information out of the bus switching unit;

multiplexing means for selecting the appropriate signal for the redriving by said driving means from a first port of said bus witching unit at a first cycle; and redrive logic means for redriving information to all the other ports of said bus switching unit via the multiplexing means in the next cycle.

9. The logical bus structure according to claim 8, wherein the bus switching unit further comprises arbitration means for arbitrating the bus after a certain bus protocol.

10. The logical bus structure according to claim 1, further comprising a cluster of at least two of said processing units connected to the bus switching unit via branched physical busses, wherein near end signal reception is accomplished by dynamically looking for signals which are transferred between two of said processing units which intercommunicate via an originating and a redriving physical bus; and keeping these signals on the originating and the redriving physical bus for at least two bus cycles.

11. The logical bus structure according to claim 10, wherein the bus switching unit provides a one-cycle control signal for near end reception signals.

12. The logical bus structure according to claim 10, wherein the bus switching unit provides a one-cycle control signal on the second cycle of the signal on the originating bus.

* * * * *